(12) United States Patent
Marino

(10) Patent No.: US 7,278,234 B2
(45) Date of Patent: Oct. 9, 2007

(54) MULTIPURPOSE TACKLE BOX

(76) Inventor: Steven Marino, 875 Steven Rd., York Haven, PA (US) 17370

( * ) Notice: Subject to any disclaimer, the term of this patent is extended or adjusted under 35 U.S.C. 154(b) by 0 days.

(21) Appl. No.: 11/200,719

(22) Filed: Aug. 11, 2005

(65) Prior Publication Data

US 2007/0033858 A1   Feb. 15, 2007

(51) Int. Cl.
*A01K 97/06* (2006.01)
*A01K 97/22* (2006.01)

(52) U.S. Cl. ............... 43/54.1; 206/315.11; 206/743; 206/748; 206/749; 206/759; 220/212; 220/23.86; 62/457.1

(58) Field of Classification Search ........... 43/54.1, 43/57.1; 206/315.11, 742, 743, 747–749, 206/757, 579, 372, 373, 349, 751, 752, 45.23, 206/45.2, 45.24; 220/212, 475, 23.83, 23.86, 220/503, 505, 761–765; 224/920; 62/457.1
See application file for complete search history.

(56) References Cited

U.S. PATENT DOCUMENTS

| | | | | |
|---|---|---|---|---|
| 244,898 A | * | 7/1881 | Hoskins | 206/541 |
| 1,749,227 A | * | 3/1930 | Pruett | 43/57.2 |
| 1,790,498 A | * | 1/1931 | Dewey | 43/54.1 |
| 1,858,539 A | * | 5/1932 | Dewey | 43/57.1 |
| 1,859,228 A | * | 5/1932 | Berry | 43/54.1 |
| 1,882,756 A | * | 10/1932 | Boynton | 206/315.11 |
| 1,954,127 A | * | 4/1934 | Harsted | 43/57.1 |
| 1,998,681 A | * | 4/1935 | Littleford, Jr. | 62/457.1 |
| 2,069,661 A | * | 2/1937 | Tiede | 43/57.2 |
| 2,131,408 A | * | 9/1938 | Murrer | 43/54.1 |
| 2,489,553 A | * | 11/1949 | Henderson | 220/761 |
| 2,501,572 A | * | 3/1950 | Marquez | 220/763 |
| 2,555,073 A | * | 5/1951 | Zdankoski | 43/54.1 |
| 2,558,124 A | * | 6/1951 | Burden | 43/57.1 |
| 2,624,973 A | * | 1/1953 | Wilcox et al. | 43/57.2 |
| 2,675,290 A | * | 4/1954 | Berry | 206/315.11 |
| 2,681,201 A | * | 6/1954 | Grunwald | 43/54.1 |

(Continued)

FOREIGN PATENT DOCUMENTS

AU     200030095 A  * 11/2000

(Continued)

*Primary Examiner*—Darren W Ark

(57) ABSTRACT

A portable multipurpose tackle box with a compartment for storing tackle, bait, and other fishing related items, and a separate cooler compartment for storing food, beverages, and bait. The top compartment can be opened to reveal several extendable tackle tray assemblies. The exterior surface of the top of the tackle box has a folding leg attached to it which can be used to support the tackle box when the tray assemblies are in an extended position. The top exterior surface also has a clip attached to it for holding a flashlight in position for the night fisherman. The handle, support leg, and clips connected to the top exterior surface pivot to a storage position which is flush with the surface to enable the top surface of the tackle box to be used comfortably as a seat. In a closed position, the tackle box defines a cavity which when combined with the fact that the tackle box is constructed of a lightweight, sturdy and waterproof material, enables the tackle box to maintain a buoyant effect if placed in water. The exterior surface of the bottom of the tackle box has rubber skid strips attached thereto to prevent the tackle box from moving either when sat upon or when being used as a typical tackle box.

12 Claims, 3 Drawing Sheets

U.S. PATENT DOCUMENTS

| | | | | |
|---|---|---|---|---|
| 2,710,093 | A | * | 6/1955 | Raker .................... 206/315.11 |
| 2,723,175 | A | * | 11/1955 | Berry .................... 206/315.11 |
| 2,823,971 | A | * | 2/1958 | May .......................... 43/54.1 |
| 2,936,066 | A | * | 5/1960 | Meksula .................... 43/54.1 |
| 2,948,080 | A | * | 8/1960 | Hawley ...................... 43/57.1 |
| 3,050,356 | A | * | 8/1962 | Messmer ............... 206/315.11 |
| 3,095,663 | A | * | 7/1963 | Miller ........................ 43/54.1 |
| 3,310,905 | A | * | 3/1967 | Davis et al. ........... 206/315.11 |
| 3,327,978 | A | * | 6/1967 | Gates ......................... 43/21.2 |
| 3,377,736 | A | * | 4/1968 | Woolworth ................ 43/57.1 |
| 3,481,066 | A | * | 12/1969 | Woolworth ................ 43/57.1 |
| 3,555,719 | A | * | 1/1971 | Butler ........................ 43/54.1 |
| 3,606,005 | A | * | 9/1971 | Meksula ................ 206/315.11 |
| 3,606,511 | A | * | 9/1971 | Henning et al. ....... 206/315.11 |
| 3,612,635 | A | * | 10/1971 | Uyeda et al. .......... 206/315.11 |
| 3,678,611 | A | * | 7/1972 | Files ........................ 43/54.1 |
| 3,712,529 | A | * | 1/1973 | Meksula ............... 206/315.11 |
| 3,967,869 | A | * | 7/1976 | Jackson .................. 312/270.1 |
| 3,985,409 | A | * | 10/1976 | Kneier ...................... 312/271 |
| D246,071 | S | * | 10/1977 | Landell et al. ............... D3/281 |
| 4,128,170 | A | * | 12/1978 | Elliott ....................... 43/54.1 |
| 4,208,826 | A | * | 6/1980 | Lindaman .................. 43/57.1 |
| 4,541,539 | A | * | 9/1985 | Matthews ...................... 43/26 |
| 4,638,593 | A | * | 1/1987 | Garcia ....................... 43/54.1 |
| 4,671,008 | A | * | 6/1987 | Lindemood ................ 43/54.1 |
| 4,691,470 | A | * | 9/1987 | Landell et al. ............... 43/54.1 |
| 4,697,379 | A | * | 10/1987 | McPhaul ..................... 43/54.1 |
| 4,759,148 | A | * | 7/1988 | Love ......................... 43/54.1 |
| 4,821,751 | A | * | 4/1989 | Chen ......................... 206/581 |
| 4,841,660 | A | * | 6/1989 | James ........................ 43/54.1 |
| 5,169,018 | A | * | 12/1992 | Fiore .................... 206/315.11 |
| 5,205,429 | A | * | 4/1993 | Woolworth et al. .......... 43/54.1 |
| 5,226,553 | A | * | 7/1993 | Fiore .................... 206/315.11 |
| 5,305,544 | A | * | 4/1994 | Testa, Jr. ..................... 43/54.1 |
| 5,333,408 | A | * | 8/1994 | Simmons ................... 43/54.1 |
| 5,347,746 | A | * | 9/1994 | Letson ................. 206/315.11 |
| 5,386,907 | A | * | 2/1995 | Kahl et al. ............ 206/315.11 |
| 5,611,170 | A | * | 3/1997 | McGuff et al. .............. 43/54.1 |
| 5,685,421 | A | * | 11/1997 | Gilmore .................... 206/349 |
| 5,730,282 | A | * | 3/1998 | Bureau ..................... 206/223 |
| 5,833,065 | A | * | 11/1998 | Burgess .................... 206/373 |
| 5,864,981 | A | * | 2/1999 | Zeman ...................... 43/54.1 |
| 5,938,023 | A | * | 8/1999 | Herron et al. ............... 43/54.1 |
| 5,992,086 | A | * | 11/1999 | Cheng ........................ 43/54.1 |
| 6,012,584 | A | * | 1/2000 | Dawson .................... 206/372 |
| 6,185,860 | B1 | * | 2/2001 | Thibodeaux ................ 43/54.1 |
| 6,189,258 | B1 | * | 2/2001 | Anderson ................... 43/54.1 |
| 6,446,382 | B1 | * | 9/2002 | Cloutier et al. .............. 43/54.1 |
| 7,013,670 | B2 | * | 3/2006 | Gonzalez et al. .......... 62/457.1 |
| 2005/0155276 | A1 | * | 7/2005 | O'Keeffe ..................... 43/54.1 |

FOREIGN PATENT DOCUMENTS

| | | | |
|---|---|---|---|
| FR | 2704725 | A1 * | 11/1994 |
| GB | 2130554 | A * | 6/1984 |
| GB | 2278032 | A * | 11/1994 |
| JP | 9-154464 | A * | 6/1997 |
| JP | 10-262531 | A * | 10/1998 |
| JP | 11-169043 | A * | 6/1999 |
| JP | 11-289944 | A * | 10/1999 |

* cited by examiner

MULTIPURPOSE TACKLE BOX

BACKGROUND OF THE INVENTION

1. Field of the Invention

The present invention relates to a multipurpose tackle box. More specifically, the invention is a portable container with a compartment for storing tackle, bait, and other fishing-related items and a separate cooler compartment for storing food, beverages, and bait.

2. Description of Prior Art

Fisherman have always had the problem of organizing and carrying the assortment of fishing equipment, bait, and food and beverage supplies which are essential to a successful fishing venture. In the past many tackle boxes have attempted to provide the avid fisherman with all of the amenities necessary to make a day of fishing both productive and enjoyable. The ideal tackle box should keep bait and food at a cool temperature to prevent spoilage and make should make fishing gear readily accessible for ease of use during fishing. The tackle box should provide the fisherman with a comfortable place to sit, and should include non-skid pads on the bottom of the box to prevent the box from sliding on a wet surface. The unit should not contain removable parts that can easily misplaced. Rather, it should incorporate all of the above features into a single unit that can be easily carried by the fisherman.

Provisions should also be incorporated into the design of the tackle box to benefit the night fisherman who needs the benefit of a flashlight while fishing and while carrying the fishing equipment but does not have an extra hand to hold the flashlight. The flashlight is clipped to the tackle box so that it may be detached and used as a separate unit when necessary. The design should be lightweight, yet sturdy and should be buoyant in case the tackle box is accidentally dropped into the water.

Several inventions have attempted to combine all of the features described above but have yielded unsatisfactory results for various reasons. One such patent is U.S. Design Pat. No. 246,071, issued on Oct. 11, 1977, to Harper Landell et al. discloses a typical fishing tackle box. The patent to Landell et al. does not disclose a cooler compartment for keeping food and bait fresh.

U.S. Pat. No. 3,678,611, issued on Jul. 25, 1972, to Charles R. Files discloses a fishing tackle carrier which is buoyant and has a compartment with a hinged cover for holding fishing lure trays. The patent to Files does not disclose a cooler compartment for keeping food and bait fresh nor any means for acting as a seat.

U.S. Pat. No. 4,128,170, issued on Dec. 5, 1978, to Charles Elliot discloses an invention consisting of a combination tackle box, insulated cooler and seat. The patent to Elliot discloses an inventions with two separable compartments which can be easily misplaced or forgotten during use. The patent to Elliot fails to give the fisherman easy access to both the fishing lure compartment and the insulated cooler compartment. Both U.S. Pat. No. 4,541,539, issued on Sep. 17, 1985, to Carroll H. Matthews, and U.S. Pat. No. 5,305,544, issued on Apr. 26, 1994, to Vincent M. Testa, Jr., disclose inventions with similar features and similar shortcomings as the patent to Elliot.

U.S. Pat. No. 5,333,408, issued on Aug. 2, 1994, to David O. Simmons, discloses a portable tackle box with interior and exterior illumination. The patent to Simmons does not disclose a detachable flashlight nor does it disclose a cooler compartment in combination with the tackle box.

U.S. Pat. No. 5,347,746, issued on Sep. 20, 1994, to Marshall G. Letson discloses a tackle box with a plurality of compartments for storing tackle, cold food and beverages, clips on the lid for securing items and supporting legs attached to the lid. The patent to Letson is unsatisfactory due to the fact that it has removable compartments that can be misplaced and compartments that are stacked on top of each other requiring the fisherman to remove the top compartment to reach the lower compartments.

Canadian Patent Number 857,141, issued on Dec. 1, 1970, to William R. Harris discloses shell and accessory case for skeet and trap shooting. British Patent Application Number 2,130,554(A), published on Jun. 6, 1984, by Graham J. Britton et al. discloses a storage device for fishing tackle having storage vessels inside of the main container. Neither the patent to Harris nor the patent to Britton et al. disclose a cooler compartment combined with the storage container.

None of the above inventions and patents, taken either singularly or in combination, is seen to describe the instant invention as claimed. Thus a multipurpose tackle box solving the aforementioned problems is desired.

SUMMARY OF THE INVENTION

The present invention relates generally to a multipurpose tackle box. More specifically, the invention is a portable container with a compartment for storing tackle, bait, and other fishing related items and a separate cooler compartment for storing food, beverages, and bait. The top compartment can be opened to reveal several extendable tackle tray assemblies. The exterior surface of the top of the tackle box has a folding leg attached to it which can be used to support the tackle box when the tray assemblies are in an extended position. The top exterior surface also has a clip attached to it for holding a flashlight in position for the night fisherman. The handle, support leg, and clips connected to the top exterior surface pivot to a storage position which is flush with the surface to enable the top surface of the tackle box to be used as a seat. When in a closed position the tackle box defines a cavity which when combined with the fact that the tackle box is constructed of a lightweight, sturdy and waterproof material, enables the tackle box to maintain a buoyant effect when placed in water. The exterior surface of the bottom of the tackle box has rubber skid strips attached thereto to prevent the tackle box from moving either when sat upon or when being used as a typical tackle box.

Accordingly, it is a principal object of the invention to provide a portable storage container with a cooler compartment to keep food and bait fresh and a separate compartment to hold fishing tools and lures.

It is another object of the invention to provide a storage container with the above attributes that is contained in a single unit to prevent the misplacing of removable parts.

It is a further object of the invention to provide a storage container with the above attributes and is sturdy enough and comfortable enough to also be used as a seat with non-skid pads on the bottom to prevent the box from slipping on a wet surface.

It is a further object of the invention to provide a storage container with the above attributes that is buoyant to prevent the loss of the tackle box if it is accidentally dropped in the water.

It is a further object of the invention to provide a storage container with the above attributes includes a pair of clips on the top surface which can secure a flashlight so that the night fisherman can illuminate his way while carrying the tackle box and can remove the flashlight and use it while fishing if he so desires.

It is a further object of the invention to provide a storage container with the above attributes and having tray assemblies to hold fishing lures and tools which can be extended and supported in a position such that the cooler compartment can be easily accessed by the fisherman.

Still another object of the invention is to provide a storage container unit that has easily accessible compartments to simplify the busy fisherman's day.

It is an object of the invention to provide improved elements and arrangements thereof in a multipurpose tackle box for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Referring to FIGS. 1–5, the present invention is a portable tackle box with a compartment for storing tackle, bait, and other fishing-related items and a separate cooler compartment for storing food, beverages, and bait. The present invention combines a number of features which are meant to simplify the tasks of the fisherman.

Figure 1:
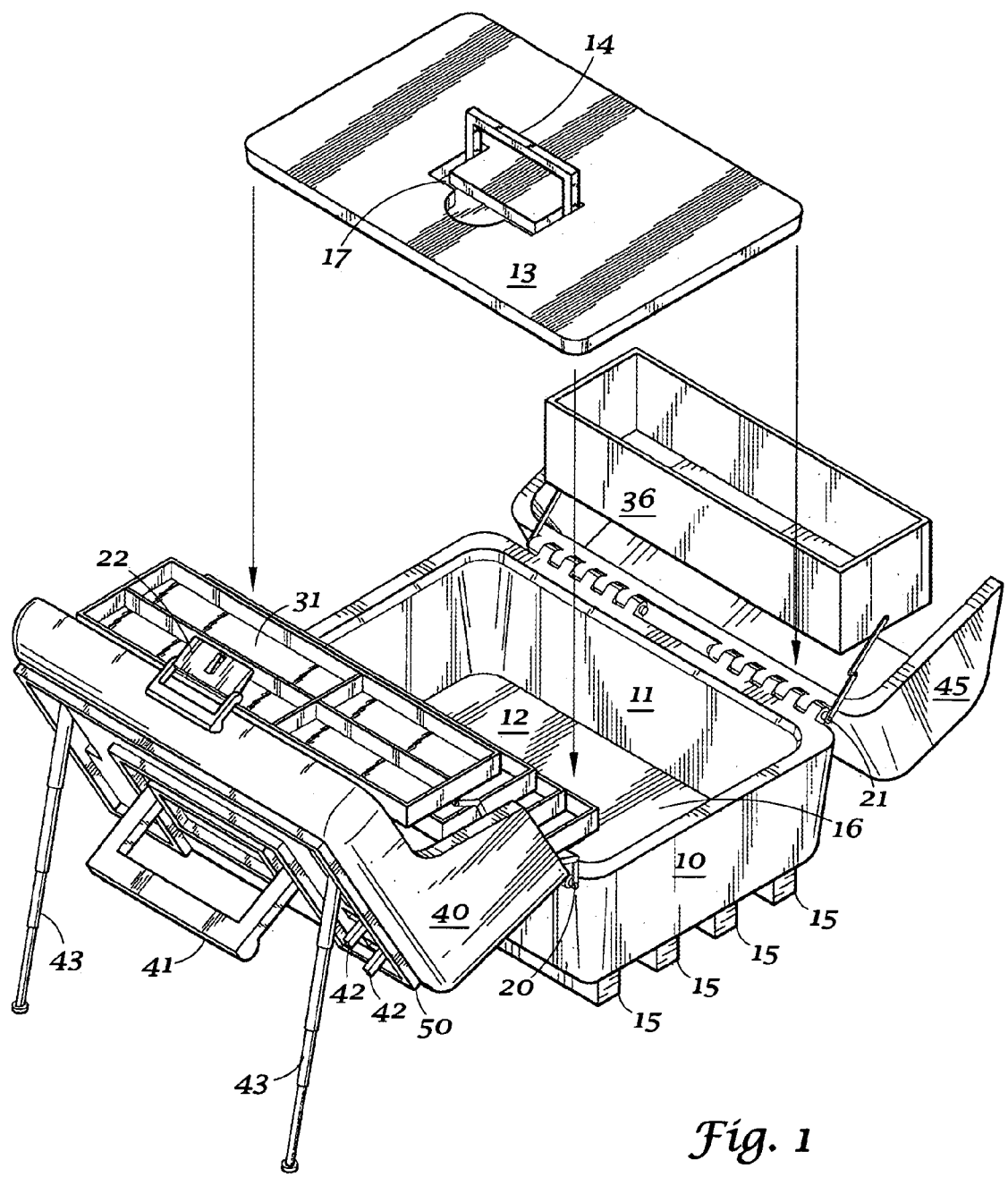
FIG. 1 is an environmental, perspective view of the preferred embodiment of the present invention showing the tackle box in an open position with the handles, flashlight support clips, and telescoping support legs in an upright position.
Figure 2:
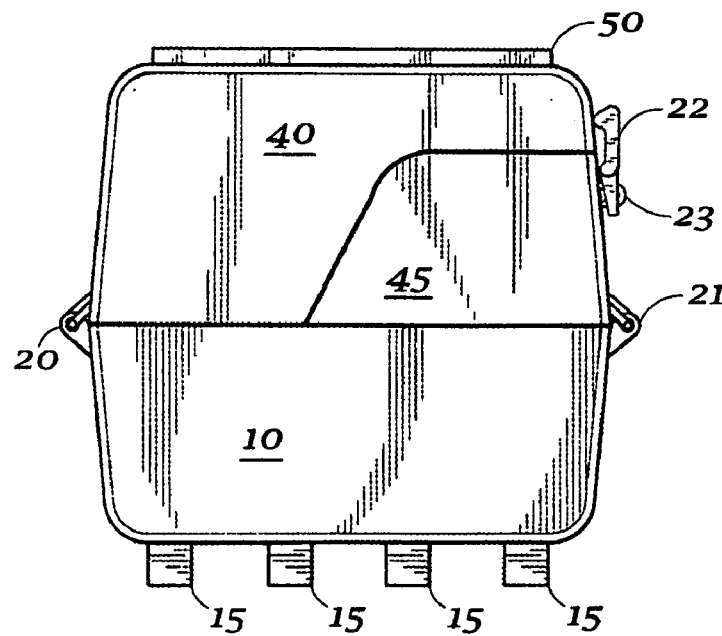
FIG. 2 is a left side elevational view of the preferred embodiment with the handle, flashlight support clips, and telescoping support legs in a folded position.
Figure 5:
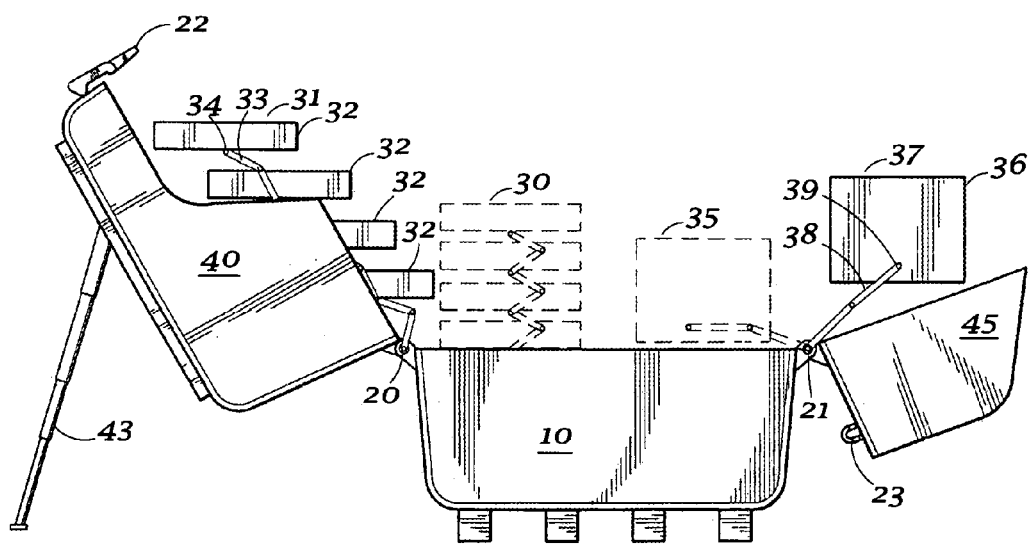
FIG. 5 is a side elevational view of the preferred embodiment shown with the lid in the open position, the folding tray assemblies in the extended position and the telescoping support legs in the extended position. The dotted lines show the tray assemblies in the retracted storage position.

Referring to FIGS. 1 and 2, the preferred embodiment of tackle box of the present invention includes a lower insulates cooler compartment 10 connected by a hinge 20 to an upper cover 40 which has a number of features affixed thereto including a handle 41, a pair of clips 42, and support legs 43. Referring to FIG. 5, the preferred embodiment of the present invention also includes a first tray assembly 30 connected to the cooler compartment 10 by hinge 20 and a second tray assembly 35 connected to the cooler compartment 19 by hinge 21. Referring to FIG. 1, the preferred embodiment of the present invention includes a cooler compartment 10 with insulated side 11 and bottom 12 walls and an insulated lid 13 with a handle 14.

As shown in FIG. 1, the cooler compartment includes four insulated side walls 11, an insulated bottom wall 12, and an insulated lid 13. In the preferred embodiment four strips of rubber non-skid pads 15 are permanently attached to the exterior of the bottom wall 12 and run the entire length of the bottom wall 12. The lid 13 sits snugly within the upper edges of the side walls 11 to create a generally air tight cavity 16 which can store cold food, beverages, bait and any other items that need to be kept cold during a fishing expedition. The lid 13 can either be separate and therefore completely removed from the cooler compartment 10 or it can be connected to one of the side walls 11 by a hinge.

The lid 13 has a handle 14 which in the preferred embodiment is pivotally attached to the lid 13. When the handle 14 is folded down into the storage position it rests in a indentation 17 in the lid so that the handle 14 sits flush with the exterior surface of the lid 13.

As shown in FIG. 5, the preferred embodiment of the present invention includes two hinged sections (40 and 45) that make up the upper cover of the tackle box. The main cover section 40 is connected to the cooler compartment 10 by hinge 20 while the smaller section 45 is connected to the cooler compartment by hinge 21 which is diametrically opposed to hinge 20. The benefit of the smaller section 45 is that it allows tray assembly 35 since it reduces the amount of clearance between the main cover 40 and the tray assembly 35 when the main cover 40 is closed. The top cover 40 is clamped shut using a latch 22 connected to the main cover 40. The latch 22 clamps down on a clip section 23 which is connected to either the small cover section 45 or the side wall 11.

As shown in FIG. 5, the preferred embodiment of the present invention includes one tray assembly 30 with multiple shallow trays 32 for holding fishing lures and other small items and a second tray assembly 35 with a single deep tray 37 for holding large fishing tools. The present invention defines an upper cavity between the top cover 40 and the insulated cooler lid 13 which houses the tray assemblies 30 and 35.

FIG. 5 shows the present invention with the top cover 40 in the open position and the tray assemblies both in the storage or retracted position (30 and 35) and in the open or extended position (31 and 36). When the tray assemblies are in the extended position (31 and 36) the cooler lid 13 may be removed without interference from the tray assemblies.

In the preferred embodiment the first tray assembly 31 is connected to hinge 20 by a pair of rotatable linkages 33 in series which attach to the sides 34 of the shallow trays 32. The second tray assembly 36 is connected to hinge 21 by a pair of rotatable linkages 38 which attached to the sides 39 of the deep tray 37. All of the trays (32 and 37) are permanently attached to the tackle box.

When the tray assemblies are in the extended position (31 and 36) the tackle box may become off-balance due to the weight of items in the trays. This creates the need for some type of stabilizing factor in order for the tackle box to remain upright during use. The present invention solves this problem by using a support leg 43 which is pivotally attached to the top cover 40. As shown in FIG. 1, the preferred embodiment of the present invention includes two support legs 43 which are positioned on the exterior surface of the top cover 40 in the two corners furthest from hinge 20. The support legs 43 are hinged to pivot around an axis which is parallel to hinge 20. In the preferred embodiment as shown in FIG. 5, the support legs 43 can be extended and locked in position such that the top cover 40 is supported in a manner that allows the tray assembly 31 to be supported by the edge of the top cover 10, thereby preventing the tackle box from tipping over when the tray assemblies are fully extended or when the tackle box is on uneven ground.

Figure 3:
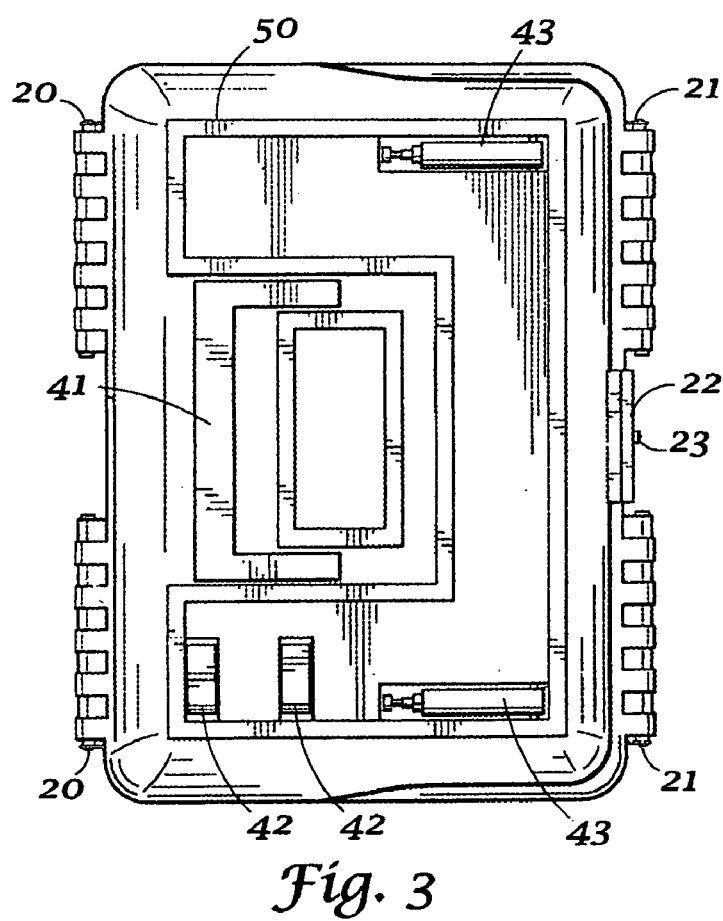
FIG. 3 is a top elevational view of the preferred embodiment of the present invention.
Figure 4:
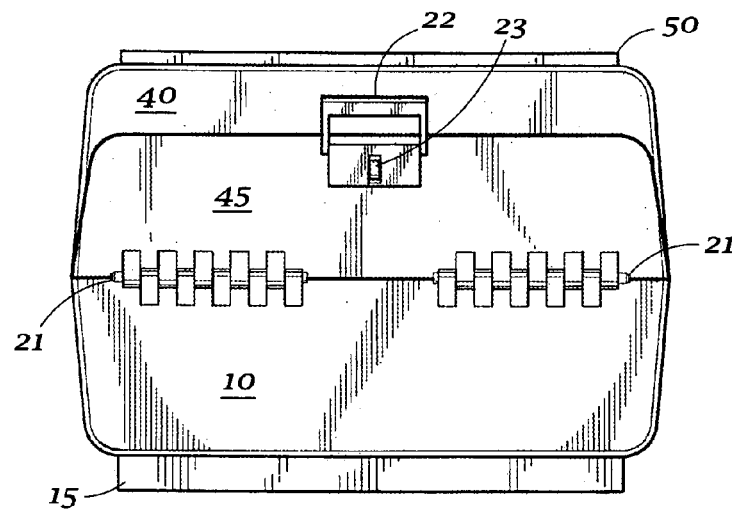
FIG. 4 is a front elevational view of the preferred embodiment of the present invention.

As shown in FIGS. 1 and 3, the present invention also includes a handle 41 and at least one pair of clips 42 attached to the exterior surface of the top cover 10. The pair of clips 42 can be used to hold a flashlight in position so that the flashlight can act as a spotlight while carrying the tackle box at night. The clips 42 allow the flashlight to be easily detached from the tackle box when the fisherman wishes to use the flashlight separately from the tackle box. In the preferred embodiment of the present invention the handle 41 and the clips 42 are pivotally attached to the top cover to allow them to be folded into a storage position when not in use.

As shown in FIGS. 1 through 4, the preferred embodiment of the present invention has a top cover 40 with recesses which allow the handle 41, the pair of clips 42, and the support legs 43 to be folded into a storage position in which they sit flush with the exterior of the top cover 40. When the handle 41, clips 42, and support legs 43 are in the storage position the exterior surface of the top cover 40 of the tackle box is essentially a flat surface which can support a seat pad (not shown) and thereby act as a seat for a weary fisherman. Alternatively the ridges 50 along the exterior surface of the top cover 40 can be removed to create a smooth flat surface (not shown) which can be used as a seat without the need for a seat pad. In order to act as a seat the present invention should be constructed of a sturdy yet lightweight material. In order to maintain the integrity of the tackle box when used as a seat, hinge 20 may need to be constructed of a single steel rod that extends the length of the tackle box.

In the preferred embodiment of the present invention, the tackle box is constructed of a water proof material and defines two generally air tight cavities which make the invention buoyant. The first cavity 16 is defined by the cooler compartment 10 and the cooler lid 13. The second compartment is defined by the top cover 40, the small cover section 45, and the cooler compartment lid 13 or the cooler compartment 10 if the cooler compartment lid 13 is not present. The cavities give the invention buoyancy to prevent the loss of the tackle box if it is accidentally pushed into the water in either the open or the closed position.

It is to be understood that the present invention is not limited to the embodiment described above, but encompasses any and all embodiments within the scope of the following claims.

I claim:

1. A multipurpose tackle box comprising:
    an insulated cooler compartment having four generally vertical walls and one horizontal wall, each of said vertical walls having upper and lower edges and being in a generally perpendicular planar orientation to adjacent vertical walls, and the lower edges of said vertical walls being generally perpendicularly connected to said horizontal wall;
    an insulated cooler lid with a handle attached to an exterior surface of said lid, said cooler compartment and said lid defining a first enclosed storage compartment when said lid is in a closed position wherein the cooler lid is placed on the upper edges of said vertical walls;
    a top cover having four generally vertical walls and one horizontal wall, each of said vertical walls having upper and lower edges and being in a generally perpendicular planar orientation to adjacent vertical walls, and the upper edges of said vertical walls being generally perpendicularly connected to said horizontal wall of the top cover portion, said top cover having a first portion being connected by a first hinge to the upper edge of one of said vertical walls of said cooler compartment in such a manner so that said top cover and said cooler lid define a second enclosed storage compartment when said top cover is in a closed position wherein the top cover is positioned over said cooler compartment and cooler lid, said top cover also having a second portion being connected by a second hinge to the upper edge of the vertical wall of said cooler compartment opposing the one of said vertical walls of said cooler compartment, and an exterior of said horizontal wall of said top cover having a handle attached thereto;
    a first tray assembly rotatably connected to said cooler compartment by a first linkage, said first linkage having a first end connected to said first tray assembly and a second end which is directly connected to said first hinge;
    a second tray assembly rotatably connected to said cooler compartment by a second linkage, said second linkage having a first end connected to said second tray assembly and a second end which is directly connected to said second hinge such that when said first and second tray assemblies are in a retracted position, said first and second tray assemblies can be covered by said top cover, and when said first and second tray assembly are in an expanded position said cooler lid can be removed; and
    at least one support leg pivotally attached to the exterior of said horizontal wall of said top cover such that, when said top cover is in an open position and said first tray assembly is in the expanded position, said tray will be held in a vertical position by said top cover which will be supported by said support leg.

2. The multipurpose tackle box as defined in claim 1 wherein said at least one support leg has extension means for supporting said top cover and said first tray assembly.

3. The multipurpose tackle box as defined in claim 2 wherein an exterior of said horizontal wall of said cooler compartment has at least one non-skid pad attached thereto.

4. The multipurpose tackle box as defined in claim 3 wherein said top cover and said cooler compartment define a water impermeable space, thereby making said space buoyant.

5. The multipurpose tackle box as defined in claim 4 having at least one pair of clips attached to the exterior of said horizontal wall of said top cover.

6. The multipurpose tackle box as defined in claim 5 wherein said top cover handle and said clips are pivotally attached to the exterior of said horizontal wall of said top cover.

7. The multipurpose tackle box as defined in claim 6 wherein said top cover has recesses such that when said top cover handle, said at least one support leg, and said clips are in a folded storage position they sit flush with an exterior horizontal surface of said top cover whereby said surface can be used as a seat.

8. The multipurpose tackle box as defined in claim 1 wherein an exterior of said horizontal wall of said cooler compartment has at least one non-skid pad attached thereto.

9. The multipurpose tackle box as defined in claim 1 wherein said top cover and said cooler compartment define a water impermeable space, thereby making said space buoyant.

10. The multipurpose tackle box as defined in claim 1 having at least one pair of clips attached to the exterior of said horizontal wall of said top cover.

11. The multipurpose tackle box as defined in claim 1 wherein said top cover handle and a pair of clips are pivotally attached to the exterior of said horizontal wall of said top cover.

12. The multipurpose tackle box as defined in claim 11 wherein said top cover has recesses such that when said top cover handle, said at least one support leg, and said clips are in a folded storage position they sit flush with an exterior horizontal surface of said top cover whereby said surface can be used as a seat.

* * * * *